United States Patent
Shi et al.

(10) Patent No.: US 8,731,559 B2
(45) Date of Patent: May 20, 2014

(54) METHOD FOR PROCESSING HANDOVER CAPABILITY AND BASE STATION

(75) Inventors: Xiaojuan Shi, Guangdong Province (CN); Yada Huang, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/257,968

(22) PCT Filed: May 28, 2010

(86) PCT No.: PCT/CN2010/073350
§ 371 (c)(1),
(2), (4) Date: Oct. 10, 2011

(87) PCT Pub. No.: WO2010/145437
PCT Pub. Date: Dec. 23, 2010

(65) Prior Publication Data
US 2012/0270552 A1    Oct. 25, 2012

(30) Foreign Application Priority Data
Nov. 5, 2009    (CN) .......................... 2009 1 0211242

(51) Int. Cl.
*H04W 36/00* (2009.01)
*H04W 4/00* (2009.01)

(52) U.S. Cl.
USPC ........... 455/436; 455/437; 455/438; 455/439; 455/443; 455/444; 370/331; 370/332; 370/333

(58) Field of Classification Search
USPC .................. 455/33.2, 436–444; 370/331–333
See application file for complete search history.

(56) References Cited

U.S. PATENT DOCUMENTS

| | | | |
|---|---|---|---|
| 2009/0047960 A1* | 2/2009 | Gunnarsson et al. | 455/436 |
| 2009/0061878 A1* | 3/2009 | Fischer | 455/436 |

FOREIGN PATENT DOCUMENTS

| | | |
|---|---|---|
| CN | 101390430 A | 3/2009 |
| CN | 101547406 A | 9/2009 |

OTHER PUBLICATIONS

International Search Report for PCT/CN/2010/073350 dated Aug. 24, 2010.

* cited by examiner

*Primary Examiner* — Jinsong Hu
*Assistant Examiner* — Dung Hong
(74) *Attorney, Agent, or Firm* — Ling Wu; Stephen Yang; Ling and Yang Intellectual Property (57) ABSTRACT

The present invention discloses a method for processing handover capability and a base station, wherein the method includes: before the Radio network Resource Control Reestablishment (RRC) is initiated in User Equipment (UE), a target base station of a target cell of the UE obtains Closed Subscriber Group (CSG) handover capability of the serving cell from the serving base station; when the RRC connection is in reestablishment, the target base station of the target cell processes the RRC connection reestablishment according to the obtained CSG handover capability. The present invention enables the behavior in UE and in the network keep in alignment after the UE finishes RRC connection reestablishment in the target cell while before it receives the first RRC connection reconfiguration message which is transmitted by the target cell.

7 Claims, 5 Drawing Sheets

METHOD FOR PROCESSING HANDOVER CAPABILITY AND BASE STATION

TECHNICAL FIELD

The present invention relates to the field of mobile communication, and in particular, to a method for handover capability processing and a base station.

BACKGROUND ART

In the establishment of a radio network system, in-door covering has become the most important part in the establishment of a network, a suitable in-door covering scheme can, on one hand, enable the network system to play its function to the utmost and create more values for the operator, and on the other hand, can greatly reduce the costs of the operator for establishing the network and actually achieve low investment and high profits. Thus, a radio access device called Home (e)NodeB emerges due to this demand. The Home (e)NodeB, as personal dedicated equipment, is deployed in personal sites such as family, group, company or school, and can provide the subscribers with various high-speed radio access services with discounted charges, meanwhile it can compensate the defect of deficient covering in the existing distributed macro radio communication system.

The Home (e)NodeB, as personal dedicated equipment, is deployed in special sites such as family, company or school, and the plurality of cells covered by a Home (e)NodeB constitute the covering area of the Home (e)NodeB. The cells covered by a macro base station (eNB) are called as macro cells, and the cells covered by a Home (e)NodeB are called as Home (e)NodeB cells. Currently the Home (e)NodeB includes three access modes: open mode, closed mode and a hybrid mode, wherein a Home (e)NodeB of open mode allows all subscribers to access, and the corresponding cells are called as Home (e)NodeB cells of open mode (open cells); a Home (e)NodeB of closed mode only allows authorized subscribers, for example authorized family members, authorized group members and the like, to access, and these authorized subscribers (member subscribers in short) constitute a closed subscriber group (CSG), and the corresponding cells are called as Home (e)NodeB cells of closed mode and are called as CSG cells in short; a Home (e)NodeB of hybrid mode also has a closed subscriber group, it does not only allow member subscribers to access, but also allows non-member subscribers to access, but the member subscribers possess preferential assurance for quality of service, preferential assignment of resources and preferential right on charges, and the corresponding cells are called as Home (e)NodeB cells of hybrid mode (hybrid cells).

After a UE (User Equipment) establishes a RRC (Radio Resource Control) connection with a serving cell, the serving base station indicates the UE, in the RRC Connection Reconfiguration message for configuring radio resources for the UE, on whether the serving cell enables handover to a CSG cell (CSG includes CSG/hybrid, which is called as CSG handover capability in this application, and is called as CSGinboundindication in short). After receiving this indication, UE judges whether the serving cell enables handover to a CSG cell and stores the CSG handover capability of the serving cell. When the UE enters the proximity of a CSG cell the UE camped, and the frequency of this CSG cell is denoted as f, if the serving cell enables handover to a CSG cell and, the UE judges that the measurement configuration of the frequency f has not been received from the serving base station yet, the UE can send to the serving base station a message (this message may be a RRC Connection Reconfiguration Request or a measurement report, which are called as message 1 collectively in this application) with the frequency f of CSG cell included. After receiving the message, the serving base station judges that the UE may have approached a CSG/hybrid cell which has been accessed before, and the serving base station can configure measurement configuration (included in measurement configuration information of the RRC Connection Reconfiguration message) on the frequency f for the UE. The UE receives this measurement configuration, performs measurement in accordance with this measurement configuration, evaluates the measurement result and reports to the serving cell the CSG/hybrid cells that meet the reporting conditions configured in the measurement configuration.

After receiving the CSGinboundindication in the RRC Connection Reconfiguration message, UE stores the indication, and before a new RRC Connection Reconfiguration message is received, the UE defaults that the capability of handover to a CSG cell of the serving cell does not change.

SUMMARY OF THE INVENTION

In the process of the UE measuring the CSG/hybrid cell according to the CSGinboundindication as described above, there are the following problems:

When the UE initiates RRC connection reestablishment, the UE will selects a suitable target cell for reestablishment at first. The target cell may be the original cell, i.e., the cell where the UE camped before performing reestablishment of RRC connection, or may be other cells different from the original cell. And then the UE reestablishes RRC connection on the target cell. In a case where the RRC connection is reestablished on other cells, since the UE defaults the CSGinboundindication to be not changeable, while the CSG handover capability of the target cell may be just different from that of the original cell, the UE may not act in accordance with the network after it finishes RRC connection reestablishment but before it receives the first RRC connection reconfiguration message from the target cell. For example, the UE believes that the target cell enables CSG handover according to the original CSGinboundindication and thus sends a message 1 to the target cell, but in fact the target cell does not enables CSG handover and cannot respond to the message 1 of the UE; or, UE thinks that the target cell does not enables CSG handover according to the original CSGinboundindication, but in fact the target cell enables CSG handover, so even if the UE has entered the proximity of a CSG/hybrid cell which it has accessed before, it will not send a message 1 to the target cell, leading to the result that the UE cannot access the corresponding CSG/hybrid cell after the UE reestablishes to the target cell, thus affecting the subscriber's service experience.

The present invention provides a method for handover capability processing and a base station, and solves the problem that the UE can not access CSG cells after the RRC connection reestablishment.

In order to solve the above technical problem, the present invention provides a method for handover capability processing, comprising:

before the Radio network Resource Control Re-establishment (RRC) is initiated in User Equipment (UE), a target base station of a target cell of the UE obtaining Closed Subscriber Group (CSG) handover capability of the serving cell from the serving base station; and during the RRC connection reestablishment, the target base station of the target cell processing the RRC connection reestablishment according to the obtained CSG handover capability.

Preferably, said CSG handover capability comprises one or more of the following capabilities:

whether to enable handover to a CSG cell, whether to allow handover to a CSG cell, and whether to enable or allow the UE to report proximity to a CSG cell.

Preferably, said step of a target base station of a target cell of the UE obtaining CSG handover capability of the serving cell from the serving base station comprises:

said target base station of said target cell obtaining CSG handover capability of the serving cell from the serving cell where the UE camps before the UE initiates RRC connection reestablishment through a handover preparation process, or a process of establishing an X2 interface between base stations, or a process of updating base station configuration.

Preferably, said step of said target base station of said target cell obtaining CSG handover capability of the serving cell through a handover preparation process comprises:

said target base station of said target cell obtaining CSG handover capability of the serving cell from a HANDOVER REQUEST message sent to the target base station from the serving base station.

Preferably, said step of the target base station of the target cell processing reestablishment of the RRC connection according to the obtained CSG handover capability comprises:

the target base station of the target cell sending a RRC message to the UE according to the obtained CSG handover capability so that the UE obtains CSG handover capability of the target cell.

Preferably, said step of the target base station of the target cell sending a RRC message to the UE according to the obtained CSG handover capability comprises steps of:

the target base station of the target cell judging whether the CSG handover capability of the target cell is consistent with the CSG handover capability of the serving cell;

if consistent, then the target base station sending a RRC message to the UE, wherein the RRC message does not carry the CSG handover capability of the target cell; or if not consistent, then the target base station sending a RRC message to the UE, wherein the RRC message carries the CSG handover capability of the target cell.

Preferably, after the target base station of the target cell sends a RRC message to the UE according to the obtained CSG handover capability, the method further comprises:

the UE processing handover capability according to the RRC message after receiving the RRC message, comprising:

the UE parsing the RRC message;

if the UE fails to obtain the CSG handover capability of the target cell by parsing the RRC message, then maintaining the stored CSG handover capability in UE; or if the UE obtains the CSG handover capability of the target cell by parsing the RRC message, then updating the stored CSG handover capability according to the CSG handover capability of the target cell.

In order to solve the above technical problem, the present invention provides a base station configured to: obtain Closed Subscriber Group (CSG) handover capability of the serving cell from the serving base station of a user equipment (UE); and to perform Radio network Resource Control (RRC) connection reestablishment according to the obtained CSG handover capability when become a target base station of a target cell of the UE performing RRC connection reestablishment.

Preferably, said base station comprises:

a CSG handover capability obtaining unit configured to: obtain CSG handover capability of the serving cell from the serving cell where the UE camps before the UE initiates RRC connection reestablishment through a handover preparation process, or a process of establishing an X2 interface between base stations, or a process of updating base station configuration; and a first message sending unit configured to: send a RRC message to the UE according to the obtained CSG handover capability after the CSG handover capability obtaining unit obtains the CSG handover capability of the serving cell so that the UE obtains the CSG handover capability of the target cell.

Preferably, said first message sending unit is configured to: judge whether the CSG handover capability of the target cell is consistent with the CSG handover capability of the serving cell, if consistent, send a RRC message to the UE, wherein the RRC message does not carry the CSG handover capability of the target cell, and if not consistent, send a RRC message to the UE, wherein the RRC message carries the CSG handover capability of the target cell.

The examples of the present invention provide a method for handover capability processing and a base station, which enable the behavior in UE and in the network keep in alignment after the UE finishes RRC connection reestablishment in the target cell while before it receives the first RRC connection reconfiguration message which is transmitted by the target cell, i.e., the UE can process measurement and reporting of the CSG/hybrid cell according to the CSG handover capability of the target cell or the policy appointed in advance by the UE and the network (predetermined policy) after the UE finishes RRC connection reestablishment while before the UE receives the first RRC connection reconfiguration message which is transmitted by the target cell to the UE.

BRIEF DESCRIPTION OF DRAWINGS

UE provided in the examples of the present invention.

PREFERRED EMBODIMENTS OF THE INVENTION

The Home (e)NodeB, as personal dedicated equipment, is deployed in special sites such as family, company or school, and the plurality of cells covered by a Home (e)NodeB constitute the covering areas of the Home (e)NodeB. The cells covered by a macro base station are called as macro cells, and the cells covered by a Home (e)NodeB are called as Home (e)NodeB cells. Currently the Home (e)NodeB includes three access modes: open mode, closed mode and a hybrid mode.

A CSG cell only allows member subscribers to access, and a hybrid cell is just a CSG cell for member subscribers, but for non-member subscribers, it is a normal cell similar to a macro cell. If a member subscriber of a CSG/hybrid cell in idle status has ever accessed a certain CSG/hybrid cell which allows access through manual CSG cell search or automatic CSG cell selection or reselection, the UE can store the related information of the CSG/hybrid cell, including one of more of the group consisting of PLMN (Public Land Mobile Network), frequency information, PCI (Physical Cell Identity), CGI (Cell Global Identifier), and TAC (Tracking Area Code) of the CSG/hybrid cell, and information representing the location of the CSG/hybrid cell, for example, the information of the neighbouring macro cell of the CSG/hybrid cell, or GNSS (global navigational satellite system) location information of the CSG/hybrid cell, and the like, and this information is called as the fingerprint of the CSG/hybrid cell in this invention for a patent. Afterwards, the UE can start to search/measure the CSG cell only when it is judged according to the fingerprint of the CSG/hybrid cell that has been stored that the UE has entered the proximity of the CSG cell.

In a long-term evolution (LTE) system, in order to ensure good quality of service in a connected state and provide the subscriber with good service experience, the UE needs to receive the measurement configuration of the macro cell, perform measurement on intra-frequency/inter-frequency/inter-RAT frequency neighbouring macro cells, and report to the serving cell the neighbouring macro cells that meet the reporting conditions configured in the measurement configuration. The serving cell makes a handover decision according to the measurement report of the UE and the related radio resource management (RRM) algorithm. The macro network deployments are all configured statically by the operator, so in the existing LTE-related techniques, in order to implement interference coordination and ensure that the UE camps on the best cell of the serving frequency, the serving cell will configure intra-frequency measurement and the UE can always perform intra-frequency measurement; but as for inter-frequency and inter-system measurements, the serving cell generally configures inter-frequency and inter-system measurements for the UE only when receiving the report of the UE that the signal strength of the serving cell is less than a configured threshold.

Figure 1:
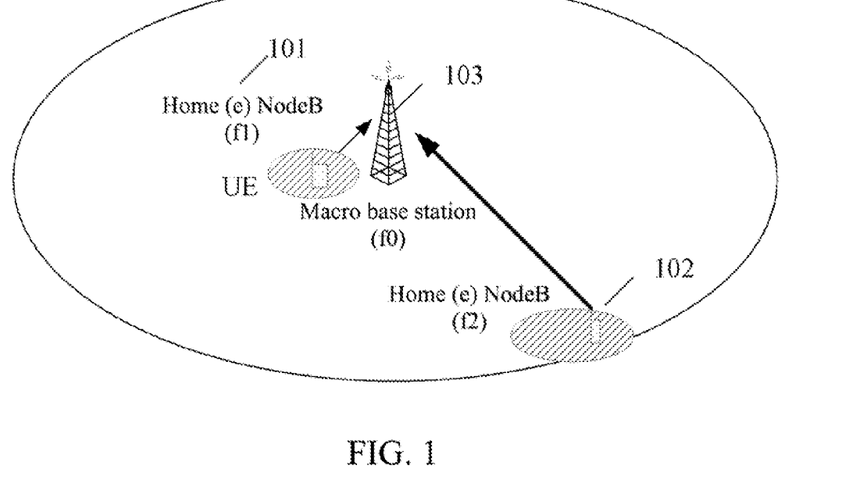
FIG. 1 illustrates the covering scopes of the Home (e)NodeB and the macro base station.

A Home (e)NodeB is a plug-and-play device and will probably be deployed in a large number in the future, and the operator cannot statically configure Home (e)NodeBs. A Home (e)NodeB may be deployed at any place covered by a macro cell, as show in FIG. 1, the frequency of the Home (e)NodeB 101 (f1). The frequency of the Home (e)NodeB 102 (f2) are two inter-frequencies compared to the frequency of the macro base station 103 (f0), the base station of the serving cell the UE currently camps. When the UE approaches the Home (e)NodeB 102, the UE is far away from the macro base station 103 at this moment, i.e., the signal strength of the serving cell is less than the configured threshold, so the technique for configuring inter-frequency measurement in the existing LTE-related technology is applicable; but when the UE approaches the Home (e)NodeB 101, the UE is very close to the macro base station 103 at this moment, the signal strength of the serving cell is far more better than the above configured threshold, so the serving base station will not configure measurement on f1 for the UE according to the existing LTE-related technology, causing the UE to be unable to measure or report the CSG/hybrid cell on f1, and finally causing the UE to be unable to handover to the Home (e)NodeB.

In order to solve the above problem, improvement is made on measurement of CSG/hybrid in the prior art, i.e., after the UE establishes RRC connection in the serving cell, the serving base station indicates UE, in a RRC Connection Reconfiguration message for configuring radio resources for the UE, on whether the serving cell enables handover to a CSG cell (or an indication on whether the serving cell allows handover to a CSG cell, or an indication on whether the serving cell enables/allows the UE to report proximity to a Home (e)NodeB cell, which is called as CSG handover capability collectively in this application for the purpose of convenient description, and is called as CSGinboundindication in short. Herein the CSG includes CSG/hybrid), Receiving the indication, the UE judges whether the serving cell enables handover to a CSG cell and stores the CSG handover capability of the serving cell, for example, if the serving cell enables handover to a CSG cell, the UE stores CSGinboundindication locally, and configures CSGinboundindication to be TRUE. Based on the stored fingerprint information, when the UE judges that it enters the proximity of a CSG cell the UE camped, the frequency of which is denoted as f, if the serving cell enables handover to a CSG cell and the UE judges that the measurement configuration of the frequency f has not been received from the serving base station yet, then the UE may send to the serving base station a message (this message may be a RRC Connection Reconfiguration Request or a measurement report, and is called as message 1 collectively in this application) with the frequency f included. After receiving the message, the serving base station judges that the UE may have approached a CSG/hybrid cell which has been accessed before, and the serving base station can configure measurement configuration on the frequency f for the UE. The UE receives this measurement configuration, performs measurement in accordance with this measurement configuration, evaluates the measurement result and reports to the serving cell the CSG/hybrid cells that meet the reporting conditions configured in the measurement configuration.

The serving base station can configure measurement configuration on inter-frequency or inter-RAT frequency for the UE according to the message 1 sent by the UE timely, thereby ensuring good mobility of the UE between a macro cell and an inter-frequency or inter-RAT Home (e)NodeB, and meanwhile avoiding blind inter-frequency or inter-RAT measurement configured for the UE.

After the UE receives the CSGinboundindication in a RRC connection reconfiguration message, it stores the indication, and before a new RRC Connection Reconfiguration message is received, the UE defaults that the capability of whether enabling handover to a CSG cell of the serving cell does not change. In the current LTE-related technology, when the UE detects reasons such as radio link failure, handover failure, integrity protection failure in L2, RRC connection reconfiguration message failure, in order to ensure continuity of the service, the UE will initiate RRC connection reestablishment, i.e., the UE firstly selects a suitable target cell for reestablishment, which may be the original cell, i.e., the cell where the UE camps before performing RRC connection reestablishment, or may be other cells different from the original cell, and then reestablishes RRC connection on the target cell. In a case where the RRC connection is reestablished on other cells, since the UE defaults the CSGinboundindication to be not changeable, and the CSG handover capability of the target cell may be just different from that of the original cell, the UE may not act in accordance with the network after the UE finishes RRC connection reestablishment while before the UE receives the first RRC connection reconfiguration message which is transmitted by the target cell to the UE.

For example, the UE thinks that the target cell enables CSG handover in accordance with the original CSGinboundindication and thus sends a message 1 to the target cell, but in fact the target cell does not enable CSG handover and cannot respond to the message 1 of the UE. On the contrary, if the UE thinks that the target cell does not enable CSG handover in accordance with the original CSGinboundindication, but in fact the target cell enables CSG handover, then even if the UE has approached a CSG/hybrid cell which it has accessed before, it will not send a message 1 to the target cell, leading to the result that the UE cannot handover to the corresponding CSG cell, thus affecting the subscriber's service experience.

In order to solve the above problem, the present invention provides a method for handover capability processing. The network architecture of a LTE system will be described firstly to introduce the method for handover capability processing better.

In a LTE system, the premise for success of RRC connection reestablishment is that a target cell must be a prepared cell, i.e., the target cell has available UE context, which includes security capability of the current UE, AS security information, E-RAB (E-UTRAN Radio Access Bearer) information established for UE, information related with RRC connection management (RRC context) and the like. In the process of RRC connection reestablishment, the target cell distributes radio resources for the UE directly according to the available UE context.

Figure 2:
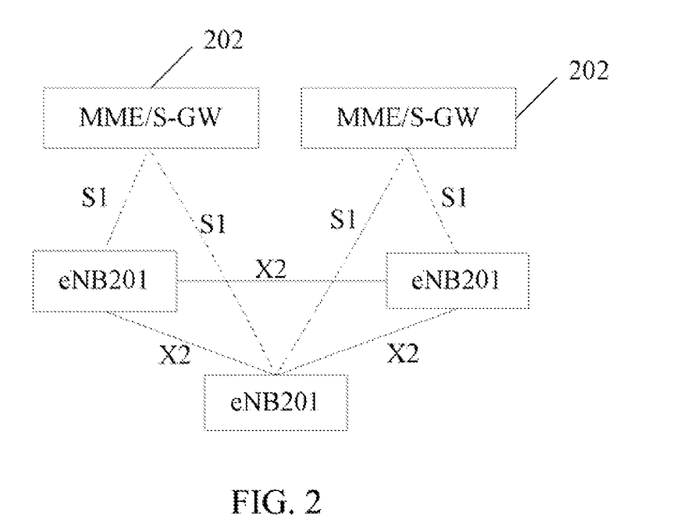
FIG. 2 illustrates the network architecture of a LTE system.

The network architecture of the LTE system is as shown in FIG. 2, including an E-RAN (Evolved Radio Access Network) which is constructed with an evolved base stations 201 (eNB), and an evolved packet core network, wherein the evolved packet core network is composed of a MME (Mobile Management Entity)/S-GW (Serving Gateway) 202. The interface between eNB201 and the core network is S1 interface, wherein, the interface between eNB201 and MME202 is indicated as S1-MME, which is used for implementing mobility management and control panel function of the S1 interface; the interface between eNB201 and S-GW202 is indicated as S1-U, which is used for implementing functions such as routing and delivery of subscriber data. eNBs are connected with each other via an X2 interface, which is used for implementing mobility management function when the user equipment is in an active state and for information interaction between equivalent eNBs.

In various examples of the present invention, the UE switches from the serving cell to the target cell (the target cell including macro cells and CSG or hybrid cells) when RRC connection is reestablished, wherein the serving cell is located under a serving base station, the target cell is located under a target base station, or both the serving cell and the target cell are located under the same base station.

The Example one of the present invention will be further introduced with reference to the attached drawings.

This example of the present invention will be described by taking the process of handover preparation of an X2 interface as an example.

Figure 3:
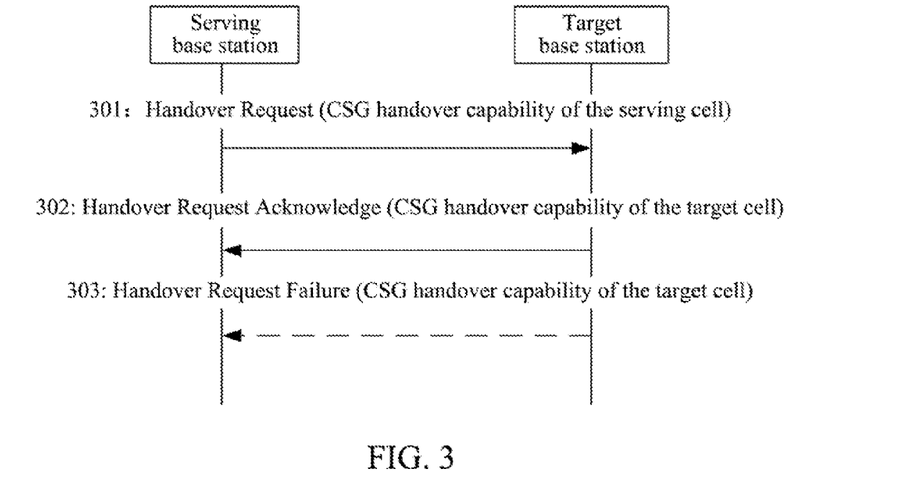
FIG. 3 is a flow chart of the target base station obtaining the CSG handover capability of the serving cell according Example One of the present invention.

In the example of the present invention, firstly the target cell obtains the CSG handover capability of the serving cell, the process of which is as shown in FIG. 3, comprising:

Step 301, the serving base station sending a HANDOVER REQUEST message to the target base station, wherein the message carries not only the UE context in the serving cell existing in the prior art, but also the CSG handover capability of the serving cell;

Step 302, after receiving the HANDOVER REQUEST from the serving base station, the target base station storing the UE context in the HANDOVER REQUEST, and judging whether the HANDOVER REQUEST can be accepted, i.e., whether the resources required by the HANDOVER REQUEST can be distributed to the UE, if can, then distributing resources to the UE and returning a HANDOVER REQUEST ACKNOWLEDGE to the serving base station, the message carrying not only E-RAB (E-UTRAN Radio Access Bearer) information existing in the prior art and information of resources distributed by the target base station for the UE, but also the CSG handover capability of the target cell; if can not, then executing step 303.

Step 303, the target base station returning a HANDOVER PREPARATION FAILURE to the serving base station, wherein the message carries not only the existing failure reasons, but also the CSG handover capability of the target cell.

If there is no X2 interface between the serving base station and the target base station, the target cell can also obtain the CSG handover capability of the serving cell through a process of handover preparation through S1 interface, i.e., the CSG handover capability of the serving cell is carried in a HANDOVER REQUIRED, and the CSG handover capability of the target cell is carried in a HANDOVER COMMAND or a HANDOVER PREPARATION FAILURE.

In addition to the process of handover preparation, the target base station can also obtains the CSG handover capability of the serving cell through a process of configuration between the serving base station and the target base station, for example, the target base station and the serving base station can obtain the CSG handover capability of each cell in adjacent base stations by carrying the capability of each cell under the base station on whether to enable CSG handover in an X2 SETUP REQUEST or an X2 SETUP RESPONSE in the process of setup of an X2 interface, or an ENB CONFIGURATION UPDATE or ENB CONFIGURATION UPDATE ACKNOWLEDGE of the X2 interface.

It should be pointed out that the examples of the present invention are only described by taking a case as an example, in this case, the target base station obtains the CSG handover capability of the serving cell where the UE currently camps, and actually for a base station, it can also obtain the CSG handover capability of all cells in its neighbouring base stations through the above procedure.

The UE is currently acquiring service transmission in the serving cell, the serving cell enables the capability of handover to a CSG cell, the UE has acquired that the serving cell enables handover to a CSG cell through a RRC connection reconfiguration message and has stored the CSG handover capability indication of the serving cell, for example, the UE has configured CSGinboundindication to be TRUE.

When the UE initiates RRC connection reestablishment due to reasons such as radio link failure, or handover failure, or integrity protection failure in L2, or RRC connection reconfiguration failure, the target base station of the target cell can process RRC connection reestablishment according to the obtained CSG handover capability.

Figure 4:
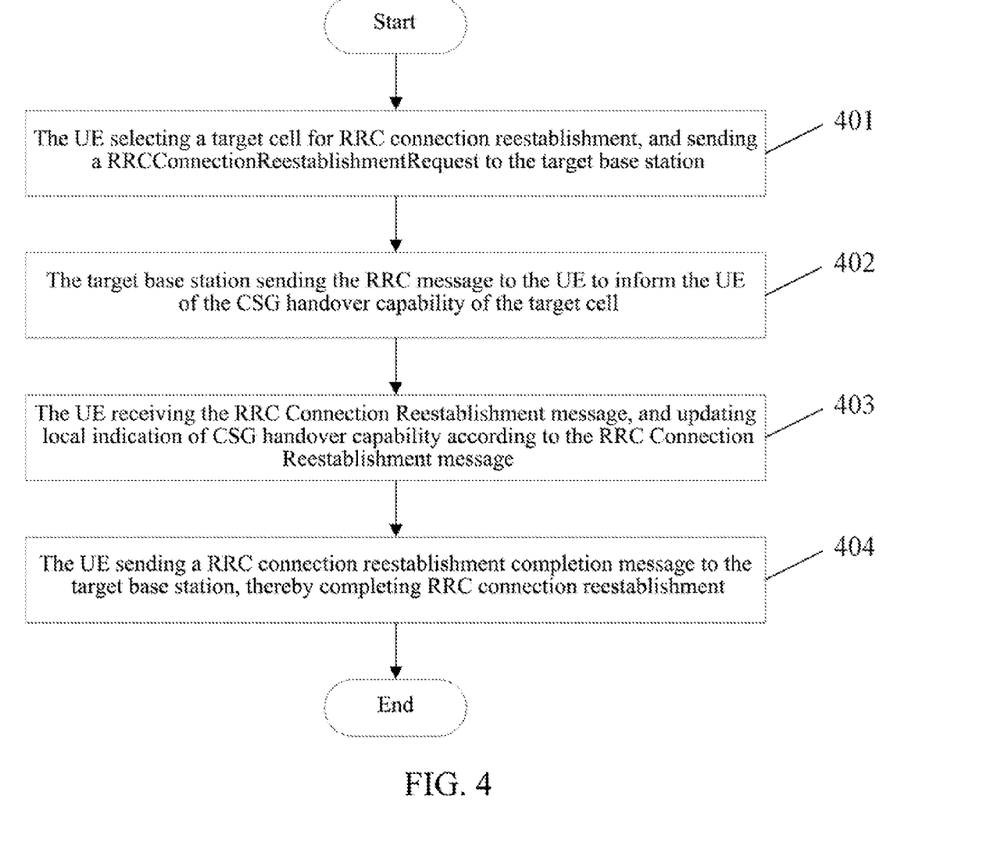
FIG. 4 is a flow chart of the method for processing handover capability provided in Example One of the present invention.

Specifically, the target base station of the target cell sends a RRC message to the UE according to the obtained CSG handover capability of the serving cell, and the UE can update the local CSG handover capability according to the CSG handover capability of the target cell configured in RRC message sent by the target base station to the UE. In the examples of the present invention, the RRC connection reestablishment message is taken as the RRC message, and the flow is as shown in FIG. 4, comprising:

Step 401, the UE selecting a target cell for RRC connection reestablishment, and sending a RRCConnectionReestablishmentRequest to the target base station;

In this step, the RRCConnectionReestablishmentRequest includes the Cell Radio Network Temporary Identifier (C-RNTI) of the UE in the original cell (the serving cell), the PCI information of the original cell, security configuration information of the UE in the original cell (Short MAC-I) and the like.

Step 402, the target base station sending the RRC message to the UE to inform the UE of the CSG handover capability of the target cell;

In the examples of the present invention, the RRC message sent by the target base station to inform the UE of the CSG handover capability of the target cell is specifically a RRC Connection Reestablishment message.

In this step, after receiving the RRCConnectionReestablishmentRequest sent by the UE, the target base station queries the obtained UE context of the UE in the original cell stored in the target base station according to the PCI of the original cell, C-RNTI of the UE in the original cell, and Short MAC-I that are carried in the RRCConnectionReestablishmentRequest, and reestablishes Signal Radio Bearer 1 (SRB1) for the UE according to the UE context, and sends it to the UE through the RRC Connection Reestablishment message.

When sending the RRC Connection Reestablishment message, the target base station judges whether it needs to send CSGinboundindication in the RRC Connection Reestablishment message according to the CSG handover capability of the target cell, which specially comprises the following two methods:

Method one, CSGinboundindication is sent in the RRC Connection Reestablishment message according to the CSG handover capability of the target cell, the CSGinboundindication can be carried in the RRC Connection Reestablishment message only when the target cell enables handover to the CSG cell to show that the target cell enables handover to the CSG cell; or the CSGinboundindication can be carried in the RRC Connection Reestablishment message regardless of whether the target cell enables handover to the CSG cell or not, for example, when the CSGinboundindication is configured to be TRUE, it is indicated that the target cell enables handover to the CSG cell, and when the CSGinboundindication is configured to be FALSE, it is indicated that the target cell does not enable handover to the CSG cell.

Method two, whether to carry the CSGinboundindication in the RRC Connection Reestablishment message is determined according to whether the CSG handover capability of the target cell and the CSG handover capability of the serving cell are consistent or not, for example, the CSGinboundindication is not carried in the RRC Connection Reestablishment message when the CSG handover capability of the target cell and the CSG handover capability of the serving cell are consistent, and is carried in the RRC Connection Reestablishment message when the CSG handover capability of the target cell is not consistent with that of the serving cell, thereby informing the UE of the CSG handover capability of the target cell.

Step 403, the UE receiving the RRC Connection Reestablishment message, and updating local indication of CSG handover capability according to the RRC Connection Reestablishment message.

In this step, UE processes the locally stored indication of CSG handover capability after receiving the RRC Connection Reestablishment message.

Corresponding to the two methods of the target base station informing the UE of the CSG handover capability of the target cell by sending the RRC Connection Reestablishment message as described in Step 402, the methods for the UE to update the indication of CSG handover capability that is locally stored upon receiving the RRC Connection Reestablishment message is as follows:

Method one, the UE parses the received RRC Connection Reestablishment message, and corresponding to the Method one as described in Step 402, if the target base station carries the CSGinboundindication in the RRC Connection Reestablishment message only when the target cell enables handover to the CSG cell, then the UE configures the local CSGinboundindication to be TRUE upon getting a CSGinboundindication by parsing the message, i.e., it is judged that the target cell enables handover to the CSG cell; and configures the local CSGinboundindication to be FALSE when it cannot get a CSGinboundindication by parsing the message, i.e., it is judged that target cell does not enable handover to the CSG cell. Or, if the target base station carries the CSGinboundindication in the RRC Connection Reestablishment message regardless of whether the target cell enables handover to the CSG cell or not, then upon getting the CSGinboundindication, the UE updates the local CSGinboundindication according to the indication, i.e., if the CSGinboundindication in the RRC Connection Reestablishment message is TRUE, then the UE configures the local CSGinboundindication to be TRUE correspondingly; if the CSGinboundindication in the RRC Connection Reestablishment message is FALSE, then the UE configures the local CSGinboundindication to be FALSE correspondingly.

It should be pointed out that in a case where a UE enabling CSG handover is reestablished to a target cell with lower-level version, as the target base station where the target cell with lower-level version is located cannot add CSGinboundindication to the RRC Connection Reestablishment message, the UE deletes the locally stored CSGinboundindication variable or configures the variable to be FALSE upon receiving the RRC Connection Reestablishment message, at which moment, the UE thinks that the reestablished target cell does not enable handover to a CSG cell.

Method two, the UE parses the received RRC Connection Reestablishment message, and corresponding to the Method two as described in Step 402, upon getting a CSGinboundindication, the UE modifies the locally stored CSGinboundindication if it judges that the CSG handover capability of the reestablished target cell and that of the original serving cell are not consistent, i.e., if the original CSGinboundindication is TRUE, then it is modified to be FALSE, and if the original CSGinboundindication is FALSE, then it is modified to be TRUE.

Step 404, the UE sending a RRC connection reestablishment completion message to the target base station, thereby completing RRC connection reestablishment.

Example two will be introduced with reference to the attached drawings.

The UE is currently implementing service transmission in the serving cell, the serving cell does not enable handover to a CSG cell, the UE has acquired that the serving cell dos not enable handover to a CSG cell through a RRC connection reconfiguration message and has stored the CSG handover capability indication of the serving cell, for example the UE has configured CSGinboundindication to be FALSE.

Figure 5:
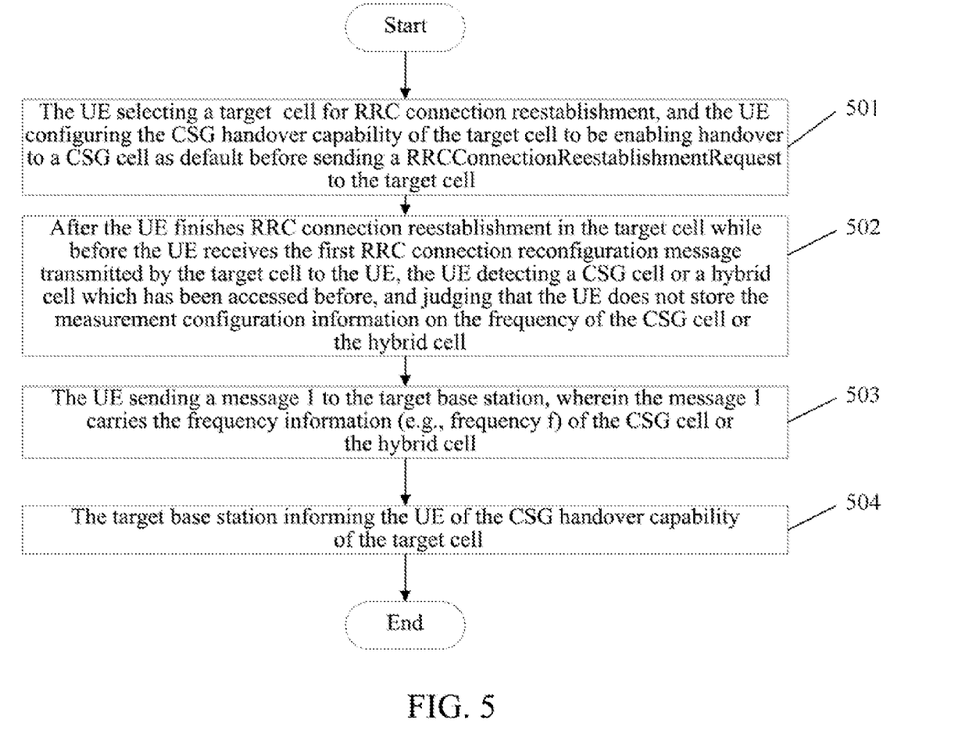
FIG. 5 is a flow chart of the method for processing handover capability provided in Example Two of the present invention.

When the UE initiates RRC connection reestablishment due to reasons such as radio link failure, or handover failure, or integrity protection failure, or RRC connection reconfiguration failure, if the UE defaults that the CSG handover capability of the target cell does not change, while the handover capability of the target cell is just the opposite, this will lead to the result that the UE does not act in accordance with the network after the UE finishes RRC connection reestablishment while before the UE receives the first RRC connection reconfiguration message (carrying the CSG handover capability of the target cell) which is transmitted by the target cell. In order to solve the above problem, the example of the present invention provides a method for handover capability processing. In the example of the present invention, when initiating RRC connection reestablishments, the UE processes the stored CSG handover capability indication according to the policy appointed in advance by the UE and the network (or a policy agreed in a protocol), as shown in FIG. 5, comprising:

Step 501, the UE selecting a target cell for RRC connection reestablishment, and the UE configuring the CSG handover capability of the target cell to be enabling handover to a CSG cell as default before sending a RRCConnectionReestablishmentRequest to the target cell;

In this step, before sending the RRCConnectionReestablishmentRequest to the target cell, the UE firstly configures the local CSGinboundindication to be TRUE (i.e., the UE defaults that the target cell enables handover to a CSG cell) according to the policy agreed by the UE and the network in advance.

Step 502, after the UE finishes RRC connection reestablishment in the target cell while before the UE receives the first RRC connection reconfiguration message transmitted by the target cell to the UE, the UE detecting a CSG cell or a hybrid cell which has been accessed before, and judging that the UE does not have the measurement configuration information of the frequency of the CSG cell or the hybrid cell;

Step 503, the UE sending a message 1 to the target base station, wherein the message 1 carries the frequency information (e.g., frequency f) of the CSG cell or the hybrid cell;

In this step, the message 1 is specially a RRC connection reconfiguration request or a measurement report.

Step 504, the target base station informing the UE of the CSG handover capability of the target cell;

In this step, the target base station needs to judge whether the policy agreed by the UE and the network in advance is consistent with the CSG handover capability of the target cell, and configures measurement configuration on the frequency f for the UE according to the judging result or informs the UE of the CSG handover capability of the target cell through a RRC connection reconfiguration message, which is specially as follows:

if the target cell enables handover to a CSG cell, then the target base station configures measurement configuration on the frequency f for the UE, and the UE receives this measurement configuration and performs measurement and measurement reporting according to the measurement configuration; or if the target cell does not enable handover to a CSG cell, then the target base station sends to the UE a RRC connection reconfiguration message which does not carry CSGinboundindication. After receiving this message, UE configures the locally stored CSGinboundindication to be FALSE, i.e., it is judged that the target cell does not enable handover to a CSG cell.

It should be pointed out that in this example, the UE can also firstly locally configures CSGinboundindication to be FALSE according to the policy agreed by the UE and the network in advance or directly delete the variable of CSGinboundindication before sending the RRCConnectionReestablishmentRequest to the target cell, i.e., the UE defaults that the target cell does not enable handover to a CSG cell after the UE finishes RRC connection reestablishment and before the UE receives the first RRC connection reconfiguration message transmitted by the target cell, and then the UE sends a RRCConnectionReestablishmentRequest to the target cell. Subsequently, the UE waits for the target cell to send a RRC connection reconfiguration message to inform the CSG handover capability of the target cell, as in the prior art.

Figure 6:
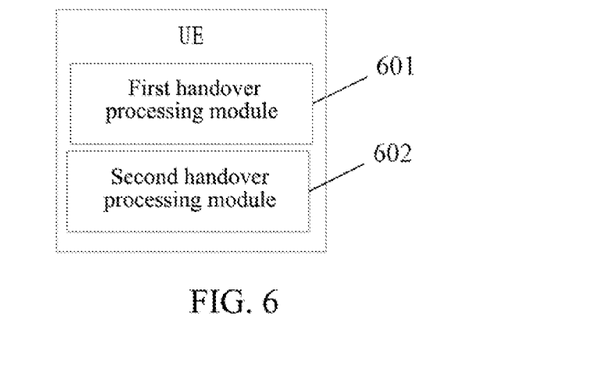

The example of the present invention further provides a UE having a structure as shown in FIG. 6, comprising:

a first handover processing module 601 configured to receive a RRC message sent by a target base station of a target cell and process handover capability according to the RRC message; and a second handover processing module 602 configured to process handover capability according to a predetermined policy.

Wherein, the UE may only include the first handover processing module 601, or only include the second handover processing module 602, or include both.

Figure 7:
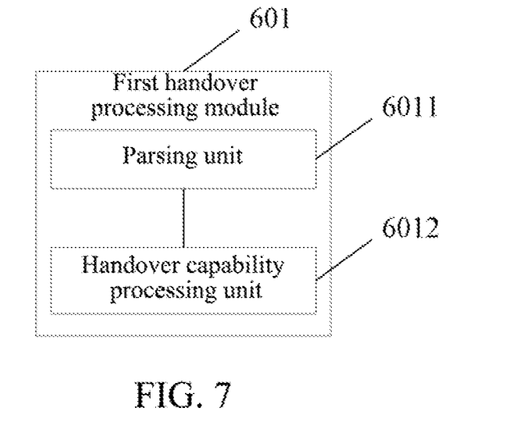
FIG. 7 illustrates the structure of the first handover processing module 601 in FIG. 6.

Further, the structure of the first handover processing module 601 is as shown in FIG. 7, comprising:

an parsing unit 6011 configured to parse the RRC message; and a handover capability processing unit 6012 configured to
  maintain the local CSG handover capability when the CSG handover capability of the target cell is not obtained through parse; or
  update the local CSG handover capability according to the CSG handover capability of the target cell when the CSG handover capability of the target cell is obtained through parsing the RRC message; or
  configure the local CSG handover capability to be not enabling handover to a CSG cell when the UE fails to obtain the CSG handover capability of the target cell through parsing the RRC message.

The example of the present invention further provides a base station configured to: obtain CSG handover capability of a serving cell from a serving base station of a UE; and to process RRC connection reestablishment according to the obtained CSG handover capability when used as a target base station of a target cell of the UE for performing RRC connection reestablishment.

Figure 8:
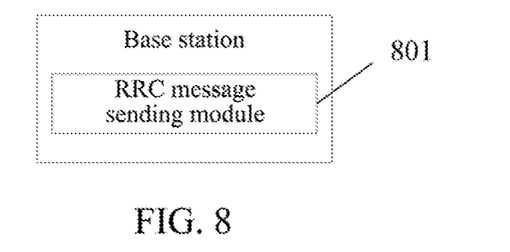
FIG. 8 illustrates the structure of a base station provided in examples of the present invention.

As shown in FIG. 8, the base station may comprise:

a RRC message sending module 801 configured to: send a RRC message to the UE which implements RRC connection reestablishment in the target cell, wherein the RRC message carries the CSG handover capability of the target cell under the base station.

Figure 9:
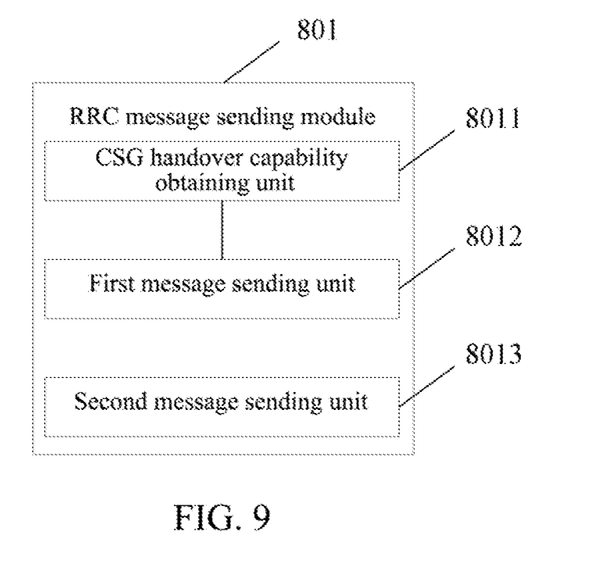
FIG. 9 illustrates the structure of the RRC message sending module 801 in FIG. 8.

Further, the structure of the RRC message sending module 801 is as shown in FIG. 9, comprising:

a CSG handover capability obtaining unit 8011 configured to: obtain CSG handover capability of a serving cell from the serving cell where the UE camps before the UE initiates RRC connection reestablishment, through a handover preparation process, or through a process of establishing an X2 interface between base stations, or through a process of updating base station configuration; and a first message sending unit 8012 configured to: send a RRC message to the UE according to the obtained CSG handover capability after the CSG handover capability obtaining unit obtains the CSG handover capability of the serving cell, so that the UE obtains the CSG handover capability of the target cell.

Specifically, the first message sending unit is configured to: judge whether the CSG handover capability of the target cell is consistent with the CSG handover capability of the serving cell, if consistent, sends a RRC message to the UE, wherein the RRC message does not carry the CSG handover capability of the target cell, and if not consistent, then sends a RRC message to the UE, wherein the RRC message carries the CSG handover capability of the target cell.

The RRC message sending module 801 may further comprise a second message sending unit 8013 configured to: judge the CSG handover capability of the target cell when the CSG handover capability obtaining unit does not obtain the CSG handover capability of the target cell, and send to the UE a RRC message carrying the CSG handover capability of the target cell when the target cell enables handover to a CSG cell, wherein the CSG handover capability is used to represent that the target cell enables handover to a CSG cell; or send to the UE a RRC message carrying the CSG handover capability of the target cell when the target cell does not enable handover to a CSG cell, wherein the CSG handover capability is used to represent that the target cell does not enable handover to a CSG cell; or, send to the UE a RRC message not carrying the CSG handover capability of the target cell when the target cell does not enable handover to a CSG cell.

Figure 10:
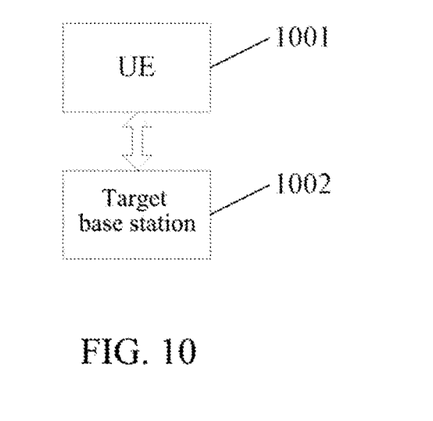
FIG. 10 illustrates the structure of the system for processing handover capability provided in the examples of the present invention.

The example of the present invention further provides a system for processing handover capability having a structure as shown in FIG. 10, comprising a UE 1001 and a target base station 1002, wherein the UE 1001 implements RRC connection reestablishment in a target cell under the target base station 1002;

The UE 1001 is configured to receive a RRC message sent by the target base station 1002 of the target cell, and process handover capability according to the RRC message; or, process handover capability according to a predetermined policy;

The target base station 1002 is configured to send a RRC message to the UE 1001, wherein the RRC message carries the CSG handover capability of the target cell.

The above UE, base station and system for processing handover capability may be combined with a method for processing handover capability provided in the examples of the present invention, and when the UE implements RRC connection reestablishment from a serving cell to a target cell, the target base station of the target cell sends a RRC message to the UE to inform the UE of the CSG handover capability of the target cell, upon receiving the RRC message, the UE updates the local CSG handover capability according to the CSG handover capability of the target cell; or, when the UE implements RRC connection reestablishment from a serving cell to a target cell, the UE processes the local CSG handover capability according to a predetermined policy, thereby enabling the UE to act in accordance with the network after the UE finishes RRC connection reestablishment in the target cell and before the UE receives the first RRC connection reconfiguration message which is transmitted by the target cell to the UE, i.e., the UE can process measurement and reporting of the CSG/hybrid cell according to the CSG handover capability of the target cell or according to the policy appointed by the UE and the network in advance (a predetermined policy) after the UE finishes RRC connection reestablishment in the target cell and before the UE receives the first RRC connection reconfiguration message which is transmitted by the target cell to the UE.

A person skilled in the art should appreciate that all or part of the steps for implementing the above method examples of the present invention can be done by instructing related hardware with a program, and the program may be stored in a computer readable storage medium, and the program includes one of the steps of the method examples or combinations thereof.

In addition, each functional unit of the each example of the present invention may be realized in the form of hardware, or may be realized in the form of a software functional module. The integrated hardware can also be stored in a computer readable storage medium when realized in the form of a software functional module and sold or used as an independent product.

The storage medium mentioned above may be a read only memory, a disk or a laser disk.

The above examples are only specific examples of the present invention, but the protection scope of the present invention is not limited thereto, all transformations or substitutions that can be readily conceived by any person having ordinary skill in the art without departing from the technical scope of the present invention shall be within the protection scope of the present invention. Therefore, the protection scope of the present invention is defined by the claims.

INDUSTRIAL APPLICABILITY

The present invention provides a method for processing handover capability and a base station, which enable the behavior in UE and in the network keep in alignment after the UE finishes RRC connection reestablishment while before the UE receives the first RRC connection reconfiguration message which is transmitted by the target cell to the UE, i.e., the UE can process measurement and reporting of the CSG/hybrid cell according to the CSG handover capability of the target cell or the policy appointed in advance by the UE and the network (predetermined policy) after the UE finishes RRC connection reestablishment and before the UE receives the first RRC connection reconfiguration message which is transmitted by the target cell to the UE.

The invention claimed is:

1. A method for processing handover capability, comprising:

before the Radio network Resource Control (RRC) Reestablishment is initiated in a User Equipment (UE), a target base station of a target cell of the UE obtaining Closed Subscriber Group (CSG) handover capability of a serving cell from a serving base station; and during the RRC connection reestablishment, the target base station of the target cell sending to the UE a RRC message which carries or does not carry CSG handover capability of the target cell according to the obtained CSG handover capability of the serving cell, so that the UE obtains the CSG handover capability of the target cell;

wherein, said step of the target base station of the target cell sending to the UE a RRC message which carries or does not carry CSG handover capability of the target cell according to the obtained CSG handover capability of the serving cell comprises steps of:

the target base station of the target cell judging whether the CSG handover capability of the target cell is consistent with the CSG handover capability of the serving cell;

if consistent, the target base station sending a RRC message to the UE, wherein the RRC message does not carry the CSG handover capability of the target cell; or if not consistent, then the target base station sending a RRC message to the UE, wherein the RRC message carries the CSG handover capability of the target cell.

2. The method for processing handover capability according to claim 1, wherein, said CSG handover capability comprises one or more of the following capabilities:

whether to enable handover to a CSG cell, whether to allow handover to a CSG cell, and whether to enable or allow the UE to report proximity to a CSG cell.

3. The method for processing handover capability according to claim 1, wherein, said step of a target base station of a target cell of the UE obtaining CSG handover capability of a serving cell from a serving base station comprises:

said target base station of said target cell obtaining CSG handover capability of a serving cell from the serving cell where the UE camps before the UE initiates RRC connection reestablishment through a handover preparation process, or a process of establishing an X2 interface between base stations, or a process of updating base station configuration.

4. The method for processing handover capability according to claim 3, wherein, said step of said target base station of said target cell obtaining CSG handover capability of the serving cell through a handover preparation process comprises:

said target base station of said target cell obtaining CSG handover capability of the serving cell from a HANDOVER REQUEST message sent to the target base station from the serving base station.

5. The method for processing handover capability according to claim 1, wherein, after the target base station of the target cell sends to the UE a RRC message which carries or does not carry CSG handover capability of the target cell according to the obtained CSG handover capability of the serving cell, the method further comprises:

the UE processing handover capability according to the RRC message after receiving the RRC message, comprising:

the UE parsing the RRC message;

if the UE fails to obtain the CSG handover capability of the target cell by parsing the RRC message, then maintaining the stored CSG handover capability of the UE; or if the UE obtains the CSG handover capability of the target cell by parsing the RRC message, then updating the stored CSG handover capability according to the CSG handover capability of the target cell.

6. A base station, comprising a Closed Subscriber Group (CSG) handover capability obtaining unit and a first message sending unit, wherein, the CSG handover capability obtaining unit is configured to, before the Radio network Resource Control (RRC) Re-establishment is initiated in a User Equipment (UE), obtain CSG handover capability of a serving cell from a serving base station of the UE, wherein the base station acts as a target base station of a target cell of the UE; and the first message sending unit is configured to, during the RRC connection reestablishment, send to the UE a RRC message which carries or does not carry CSG handover capability of the target cell according to the obtained CSG handover capability of the serving cell, so that the UE obtains the CSG handover capability of the target cell;

wherein, said first message sending unit is further configured to: judge whether the CSG handover capability of the target cell is consistent with the CSG handover capability of the serving cell, if consistent, send a RRC message to the UE, wherein the RRC message does not carry the CSG handover capability of the target cell, and if not consistent, send a RRC message to the UE, wherein the RRC message carries the CSG handover capability of the target cell.

7. The base station according to claim 6, wherein said CSG handover capability obtaining unit is further configured to: obtain CSG handover capability of a serving cell from the serving cell where the UE camps before the UE initiates RRC connection reestablishment through a handover preparation process, or a process of establishing an X2 interface between base stations, or a process of updating base station configuration.

\* \* \* \* \*